(12) United States Patent  
Takeuchi et al.

(10) Patent No.: US 6,442,855 B2
(45) Date of Patent: Sep. 3, 2002

(54) TILT SENSOR

(75) Inventors: Yoshiaki Takeuchi, Saitama; Hiroshi Kawamoto, Tochigi, both of (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/790,657

(22) Filed: Feb. 23, 2001

(30) Foreign Application Priority Data

Feb. 25, 2000 (JP) .................................. 2000-048559

(51) Int. Cl.⁷ .................................................. G01C 9/06
(52) U.S. Cl. ............................... 33/366.19; 33/366.11
(58) Field of Search ........................ 33/336.19, 366.11, 33/366.25; 340/689

(56) References Cited

U.S. PATENT DOCUMENTS

| | | | | |
|---|---|---|---|---|
| 3,906,471 A | * | 9/1975 | Shawhan | 33/366.11 |
| 4,521,973 A | * | 6/1985 | Wiklund et al. | 33/366.19 |
| 5,237,753 A | * | 8/1993 | Carlson et al. | 340/689 |
| 5,261,279 A | * | 11/1993 | Wolf et al. | 33/366.25 |
| 6,311,406 B1 | * | 11/2001 | Yashiro et al. | 33/366.19 |

FOREIGN PATENT DOCUMENTS

| | | |
|---|---|---|
| JP | 453528 | 12/1992 |
| JP | 514168 | 4/1993 |

* cited by examiner

Primary Examiner—G. Bradley Bennett
(74) Attorney, Agent, or Firm—Birch, Stewart, Kolasch & Birch, LLP

(57) ABSTRACT

A tilt angle sensor is disclosed that is capable of detecting whether a tilt angle of a reference plane exceeds a predetermined value by means of only one threshold value. Although only one threshold value is used, the tilt angle can be measured with respect to either a clockwise or a counterclockwise direction from the untilted state. A pair of differential electrodes electrically independent of each other are formed in a shape symmetric with respect to upper and lower sections of a printed circuit board. A common electrode plate is mounted opposed to the pair of differential electrodes with a predetermined gap therebetween. The pair of differential electrodes and the common electrode is stored in a closed space formed by the printed circuit board and an oil case. A dielectric liquid is filled into the closed space in such a way that the level of the liquid varies according to the tilt of the reference plane. An output signal corresponding to the difference in capacity between two capacitors formed by associated components is produced as a tilt detection output.

20 Claims, 8 Drawing Sheets

TILT SENSOR

BACKGROUND OF THE INVENTION

1. Field of the Invention

The present invention relates to an electrostatic type tilt sensor which is used for detecting a tilt angle with respect to a plane perpendicular to the direction of gravity, more particularly to a tilt sensor providing an alarm or conducting a predetermined control when a detected tilt angle exceeds a predetermined value.

2. Background Art

Conventional tilt sensors employing a tilt detection element are described in Japanese Unexamined Utility Model Publication No. 4-53528 and Japanese Examined Utility Model Publication No. 5-14168. An electrostatic type tilt sensor having these types of conventional structure is shown in FIG. 5 and FIG. 6.

FIG. 5 is an exploded view of a conventional tilt sensor. FIG. 6 is a cross-sectional view of a conventional tilt sensor along a plane cut normal to a front surface of the tilt detection element.

A printed circuit board 1 made of a heat resistant material, for example a laminate plate made of glass cloth and epoxy resin, is disposed vertically with respect to a reference plane for measuring a tilt angle when a tilt sensor is fixed to an object whose tilt angle is to be measured. In FIG. 5, this reference plane is designated by the plane including an imaginary line L0 represented by a double-dotted and dashed line. This plane defined by the imaginary line L0 becomes a reference plane from which to measure tilt angle.

The reference plane is in a "0 degree" tilt angle when the reference plane includes a line normal to the direction of gravity. In the printed circuit board 1, a pair of differential electrodes 2a, 2b are formed of a copper foil pattern electrically independent of each other in two regions. The two regions (left and right) are defined by a plane formed along the intersection of (an imaginary line L1 shown by a double dot and dash line in FIG. 5) both the reference plane and the surface of the printed circuit board 1.

The signal processing circuit section of the tilt sensor, which includes a printed wiring pattern and related electronic parts will be described hereinafter. The signal processing circuit section is mounted on a surface opposite to the surface on which the differential electrodes 2a, 2b of the printed circuit board 1 are formed. The respective differential electrodes 2a, 2b are connected to the copper foil pattern on the surface of the printed circuit board 1. The signal processing circuit section is formed via through holes, at the electrode points 2c, 2d shown in FIG. 5.

The pair of differential electrodes 2a, 2b are formed as an electrode pattern which is symmetric with respect to the imaginary line L1. Also, each electrode of the pair of differential electrodes 2a, 2b is formed as an electrode pattern which is symmetric with respect to the imaginary line L2. Imaginary line L2 is the line that is normal to the imaginary L1 in FIG. 5. In the example shown in FIG. 5, each of the differential electrodes 2a, 2b is shaped like a horizontal fan.

In the example shown in FIG. 5, the arc-shaped periphery of each of the differential electrodes 2a, 2b follows the shape a circular arc. The circular arc is defined by a circle with its center at the point of intersection of the imaginary line L1 and the imaginary line L2. In this example, the diameter of the circle is set at 30 mm.

A reference numeral 3 designates a common electrode plate formed of a conductive material having a desired rigidity. As shown in FIG. 6, this common electrode plate 3 is mounted on the printed circuit board 1 in a state where it is held in parallel to the differential electrodes 2a, 2b with a certain gap between them. A plurality of terminals 3a, 3b, 3c, 3d are inserted into the printed circuit board I which are integral with the common electrode plate 3 and are formed by bending the plate 3 at right angles. The terminals 3a, 3b, 3c, 3d are inserted into terminal holes 4a, 4b, 4c, 4d made in the printed circuit board 1 and are secured by soldering them to the surface of the printed circuit board 1 on which the signal processing circuit section is formed.

An oil case 5 formed of plastics having a desired flexibility is formed in the shape of a letter U in cross section. When an end face of the oil case 5 is bonded to the printed circuit board 21 with bonding means such as a double-faced adhesive tape 5B or the like, the oil case 5 forms a closed space with the surface of the printed circuit board 1.

The peripheries of the differential electrodes 2a, 2b, the periphery of the common electrode 3, and the periphery of the case 5 are formed concentrically with each other. The opposite faces of the differential electrodes 2a, 2b, that of the common electrode 3, and the corresponding face of the case 5 are formed in parallel to each other.

The closed space formed by the case 5 and the printed circuit board 1 is filled with a dielectric liquid 7 such as a silicone oil or the like. The dielectric liquid 7 is poured from a through hole 6 made in the printed circuit board 1 to the level of approximately half the effective volume in the closed space, e.g. to the level of the imaginary line L2 shown in FIG. 5. The through hole 6 of the printed circuit board 1 is filled with the dielectric liquid 7 and is then sealed.

An electrostatic shielding plate 8 is mounted on a side of the printed circuit board 1 to cover the case 5 and its surroundings and the electrostatic shielding plate 9 is mounted on a second side of the printed circuit board 1 to cover the signal processing circuit section described hereinafter.

FIG. 7 is a schematic view of a signal processing circuit section of an exemplary, conventional tilt sensor. In FIG. 7, an oscillator 11 and the output terminal thereof are connected to the common electrode plate 3 of the tilt detection element 10 having the characteristics described in FIG. 5 and FIG. 6. Further, the pair of differential electrodes 2a, 2b of the tilt detection element 10 are connected to the input terminals of capacity-voltage conversion circuits 12a, 12b, respectively.

The output terminals of the capacity-voltage conversion circuits 12a, 12b are connected to the input terminals of a differential amplifier circuit 13, respectively. An output terminal 14 of the tilt sensor is led out of the differential amplifier circuit 13. The signal processing circuit section is provided with a power stabilizing circuit 15 and the stabilized voltage supplied from this power stabilizing circuit 15 is supplied to the oscillator 11 and the differential amplifier circuit 13 as a power supply voltage.

Since the signal processing circuit section is arranged in the manner described hereinabove, an oscillation output signal of a predetermined frequency from the oscillator 11 is supplied to the capacity-voltage conversion circuits 12a through a first capacitor connected by the differential electrode 2a and the common electrode plate 3 and also to the capacity-voltage conversion circuits 12b through a second capacitor connected by the differential electrode 2b and the common electrode plate 3.

Accordingly, peak value signals corresponding to the capacity of the first capacitor and the capacity of the second capacitor are applied to the capacity-voltage conversion circuits 12a, 12b, respectively.

The capacity-voltage conversion circuits 12a, 12b rectify the input signals, and produce smoothed voltage. Therefore, the respective output voltages of the capacity-voltage conversion circuits 12a, 12b correspond to peak values of the input signals. The capacity of the first capacitor and the capacity of the second capacitor correspond to their respective input signals.

Therefore, the differential amplifier circuit 13 produces a differential voltage between the output voltage of the capacity-voltage conversion circuits 12a and the output voltage of the capacity-voltage conversion circuits 12b as the output of the tilt sensor at the output terminal 14. In summary, the differential amplifier circuit 13 produces an output voltage corresponding to the difference in capacity between the first capacitor and the second capacitor.

The tilt sensor, provided with the tilt detection element 10 and the signal processing circuit section, is mounted on a plane to be measured, e.g. the reference plane for measuring the tilt of the object to be measured as described above. The tilt sensor is placed such that the surface of the printed circuit board 1 of the tilt detection element 10 becomes the plane to be measured.

When a plane to be measured is not tilted in the tilt direction that is desired to be measured, a differential voltage of zero is obtained. The plane to be measured includes a line normal to the direction of gravity and essentially remains unchanged. Under this condition, the dielectric liquid 7 is brought into a state where approximately half of the respective differential electrodes 2a, 2b are immersed dipped in the dielectric liquid 7. Accordingly, the capacity of the first capacitor associated with the differential electrode 2a and the common electrode plate 3 are equal to the capacity of the second capacitor associated with the differential electrode 2b and the common electrode plate 3. Therefore, the difference in output voltage between the capacity-voltage conversion circuits 12a, 12b becomes zero. The output voltage of the differential amplifier circuit 13 becomes a corresponding voltage Vo.

When the plane to be measured is tilted in the tilt direction to be measured, the liquid levels of the dielectric liquid 7 will change. The liquid level of the dielectric liquid 7 is brought into a state where one of the differential electrodes 2a, 2b is immersed in the dielectric liquid 7 in proportion to the tilt angle experienced by the plane being measured (e.g., surface of the printed circuit board 1) and the opposite differential electrode 2a, 2b is no longer exposed to the dielectric liquid 7 in proportion to the tilt angle experienced by the plane being measured. A difference in capacity is produced by this effect corresponding to (and representative of) the tilt angle between the first capacitor and the second capacitor.

As seen in FIG. 5, when the plane to be measured is tilted in the +θ direction (for example, counterclockwise) from the position where the tilt angle is 0 degree, the capacity of the first capacitor is decreased and the capacity of the second capacitor is increased. Therefore, the output voltage of the capacity-voltage conversion circuit 12a becomes larger than that of the capacity-voltage conversion circuit 12b. Therefore, the output voltage of the differential amplifier circuit 13 is made larger than the voltage Vo by the amount corresponding to the tilt angle in the +θ direction.

On the other hand, when the plane to be measured is tilted in the −θ direction (for example, clockwise) from the position where the tilt angle is 0 degree, the capacity of the second capacitor is decreased and the capacity of the first capacitor is increased and hence the output voltage of the capacity-voltage conversion circuit 12a becomes smaller than that of the capacity-voltage conversion circuit 12b. Therefore, the output voltage of the differential amplifier circuit 13 is made smaller than the voltage Vo by the amount corresponding to the tilt angle in the −θ direction.

The differential amplifier circuit 13 produces the voltage corresponding to the difference in the output voltage between the capacity-voltage conversion circuits 12a, 12b, or the difference in capacity between the two capacitors.

FIG. 8 is a graphical view showing output voltage characteristics of a conventional tilt sensor. As seen in FIG. 8, the output voltage of the differential amplifier circuit 13 is a direct current varying linearly in proportion to the tilt angle of the plane to be measured from the position where the plane to be measured at tilt angle=0, wherein the tilt angle includes the tilt direction from the position where the plane to be measured at tilt angle=0.

In aforementioned structure, the differential electrodes 2a, 2b and the common electrode plate 3 are shaped like the fan described above so that the output voltage of the differential amplifier circuit 13 corresponds linearly to a change in the tilt angle, as shown in FIG. 8.

The measurement of tilt angle through this type of conventional tilt sensor is often used to provide an alarm indicating that the plane to be measured is tilted more than a predetermined value. A threshold voltage is set for the output voltage of the differential amplifier circuit 13. An alarm is issued when the output voltage exceeds the threshold voltage. Here, since the output voltage characteristics of a conventional tilt sensor vary linearly with respect to the tilt angle, threshold voltages are set for each tilt angle direction, e.g. a threshold voltage V1 corresponding to a threshold tilt angle for tilt angles in the +θ direction and a threshold voltage V2 corresponding to a threshold tilt angle for tilt angles in the −θ direction.

An alarm circuit includes a first detection circuit for issuing an alarm when the output voltage of the differential amplifier circuit 13 is larger than the voltage V1 when the plane to be measured is tilted in the +θ direction and at a second detection circuit for issuing an alarm when the output voltage of the differential amplifier circuit 13 is smaller than the voltage V2 when the plane to be measured is tilted in the −θ direction.

However, in the aforementioned arrangements using a conventional tilt sensor, the alarm circuit is necessarily complex. Since the alarm circuit is required to set different threshold voltages and to have different detection circuits for both tilt directions (+θ and −θ) from the position where the plane to be measured is at the tilt angle of 0 degrees.

SUMMARY OF THE INVENTION

The present invention overcomes the shortcomings associated with the related art and achieves other advantages not realized by the related art.

An aspect of the present invention is to provide a tilt sensor capable of detecting variations in tilt angle for use in an alarm circuit utilizing only one threshold value.

An aspect of the present invention is to provide an alarm circuit having a tilt sensor that utilizes one threshold value for tilt angle that is indicative of tilt angle, irrespective of the direction of tilt of the plane to be measured from the 0 degree or no-tilt position.

These and other aspects are accomplished by a tilt sensor comprising a printed circuit board disposed in a direction normal to a reference plane for measuring a tilt angle; a pair of differential electrodes mounted on the printed circuit board; a common electrode plate opposed to the pair of differential electrodes with a predetermined gap formed between the differential electrodes; a common electrode fixed to the printed circuit board by a terminal formed from the common electrode plate; a dielectric liquid filled into a closed space in a state where its surface level varies according to the tilt angle of the reference plane; a signal processing circuit section formed on the printed circuit board, the signal processing circuit section producing an output signal corresponding to a difference in capacity between two capacitors, each capacitor includes the common electrode and a respective differential electrode of the pair of differential electrodes, as a tilt angle detection output, wherein the pair of differential electrodes are mounted electrically independently of each other in upper and lower regions respectively, wherein the upper and lower regions are divided by a horizontal centerline, the horizontal centerline passing through a center of gravity of the printed circuit board in a direction normal to a direction of gravity when the printed circuit board is in a "no tilt" condition, and the pair of differential electrodes are formed in shapes symmetrical to said horizontal centerline and a vertical centerline of the printed circuit board, the vertical centerline passing through said center of gravity and normal to the horizontal centerline; and an oil case for storing the pair of differential electrodes and the common electrode plate and forming the closed space between itself and the printed circuit board.

These and other aspects are accomplished by a tilt sensor comprising a printed circuit board disposed in a direction normal to a reference plane for measuring a tilt; a pair of differential electrodes mounted on the printed circuit board, which are electrically independent of each other; a common electrode plate opposed to the pair of differential electrodes with a predetermined gap therebetween; a common electrode fixed to the printed circuit board by a terminal formed of the common electrode plate; a case body for storing the pair of differential electrodes and the common electrode plate in the closed space formed by itself and the printed circuit board; a dielectric liquid filled into the closed space in the state where its surface level varies according to the tilt of the reference plane; and a signal processing circuit section which is formed on the printed circuit board and is capable of producing the output signal of the level corresponding to the difference in capacity between two capacitors, each of which is constituted of the common electrode and each of the pair of the differential electrodes, as a tilt detection output, wherein the pair of differential electrodes are mounted electrically independently of each other in the regions which are divided by a first intersection where a plane parallel to the reference plane intersects the printed circuit board, and are formed in a shape symmetric with respect to the first intersection, and each of the pair of differential electrodes is formed in a shape symmetric with respect to a second intersection where a plane normal to the reference plane intersects the printed circuit board; wherein the dielectric liquid is filled into the closed space to the level of the first intersection; and wherein the signal processing circuit section includes: a buffer circuit for receiving a signal of a predetermined frequency from the outside and supplying it to the common electrode; a first capacity-voltage conversion circuit for rectifying a signal taken out of a first capacitor constituted by the common electrode and one electrode of the pair of differential electrodes and converting it into voltage; a second capacity-voltage conversion circuit for rectifying a signal taken out of a second capacitor constituted by the common electrode and the other electrode of the pair of differential electrodes and converting it into voltage; and a differential amplifier circuit for producing the difference between the output voltage of the first capacity-voltage conversion circuit and that of the second capacity-voltage conversion circuit.

When a tilt sensor according to the present invention is mounted on a reference plane for measuring a tilt angle, e.g. the surface of the printed circuit board 1 becomes a the plane to be measured, the output signal of the signal processing circuit section has the following varying characteristics.

In the zero degree, or "no tilt" condition, the plane to be measured is not tilted in the tilt direction to be measured and only one of the pair of differential electrodes is dipped in the dielectric liquid and the output signal of the signal processing circuit section becomes a predetermined value Vn. The predetermined value Vn corresponds to the difference in capacity between the two capacitors.

When the plane to be measured is tilted in either tilt direction to be measured, the output signal of the signal processing circuit section becomes approximately the predetermined value Vn described above in the range of the tilt angle where the level of the dielectric liquid does not reach the other electrode of the pair of differential electrodes. Where the plane to be measured is tilted in either the +θ or −θ tilt directions, as described above, the predetermined value Vn is approximately obtained.

When the plane to be measured is further tilted in either tilt direction, and the level of the dielectric liquid reaches the other differential electrode of the pair of differential electrodes, variations in capacity corresponding to either differential electrode are obtained. In either of the cases where the plane to be measured is tilted in the +θ or −θ directions, a part of one differential electrode will be removed from the dielectric liquid by some degree and a part of the other differential electrode will become immersed in the dielectric liquid by a corresponding amount.

In this state, the capacity of the capacitor which has been dipped in the dielectric liquid is decreased (formed of one differential electrode and the common electrode), while the capacity of the capacitor which is dipped in the dielectric liquid is increased (formed of the other differential electrode and the common electrode).

Accordingly, the difference in capacity between the two capacitors is decreased and hence the level of the output signal from the signal processing circuit section is decreased relative to the tilt angle. Here, the output signal varies in the same way in either of the cases where the plane to be measured is tilted in the either the +θ or −θ tilt direction, as described above.

Therefore, according to the present invention, the number of threshold values required for detecting a tilt angle larger than a predetermined tilt angle is reduced to one threshold value used for either tilt direction.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not intended to limit the present invention to the embodiments shown, and wherein.

DETAILED DESCRIPTION OF THE PREFERRED EMBODIMENTS

Figure 1:
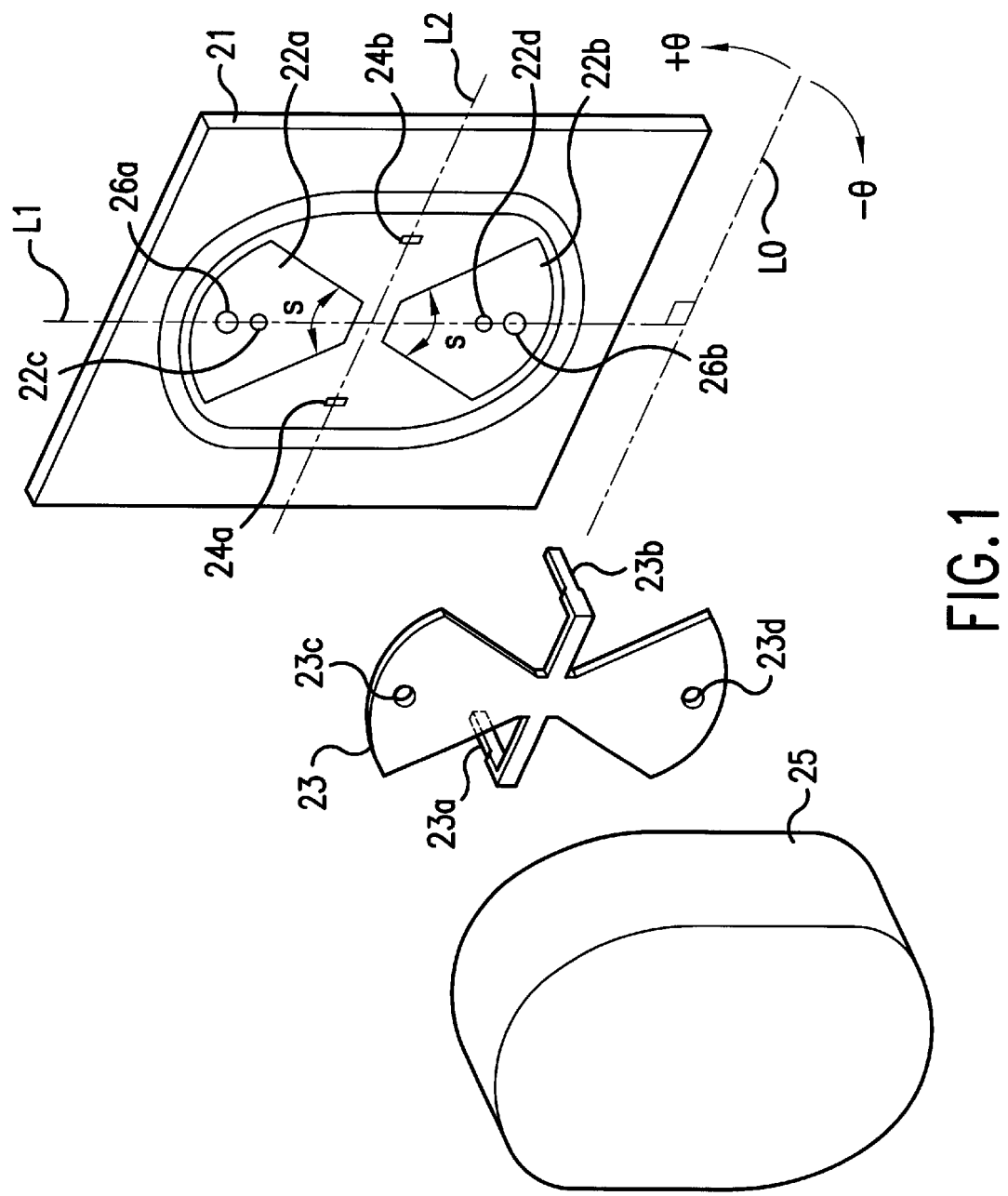
FIG. 1 is an exploded view of a tilt sensor according to an embodiment of the present invention.
Figure 2:
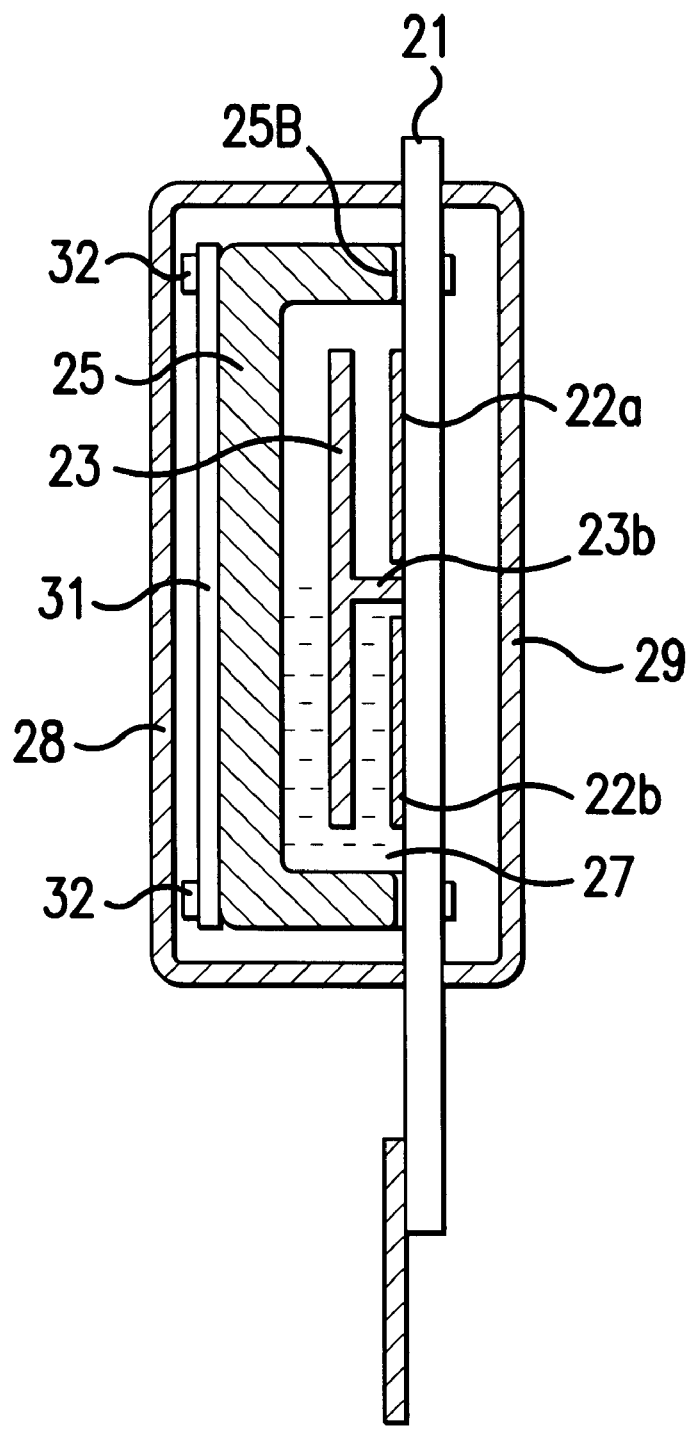
FIG. 2 is a cross-sectional view of a tilt sensor according to an embodiment of the present invention.
Figure 3:
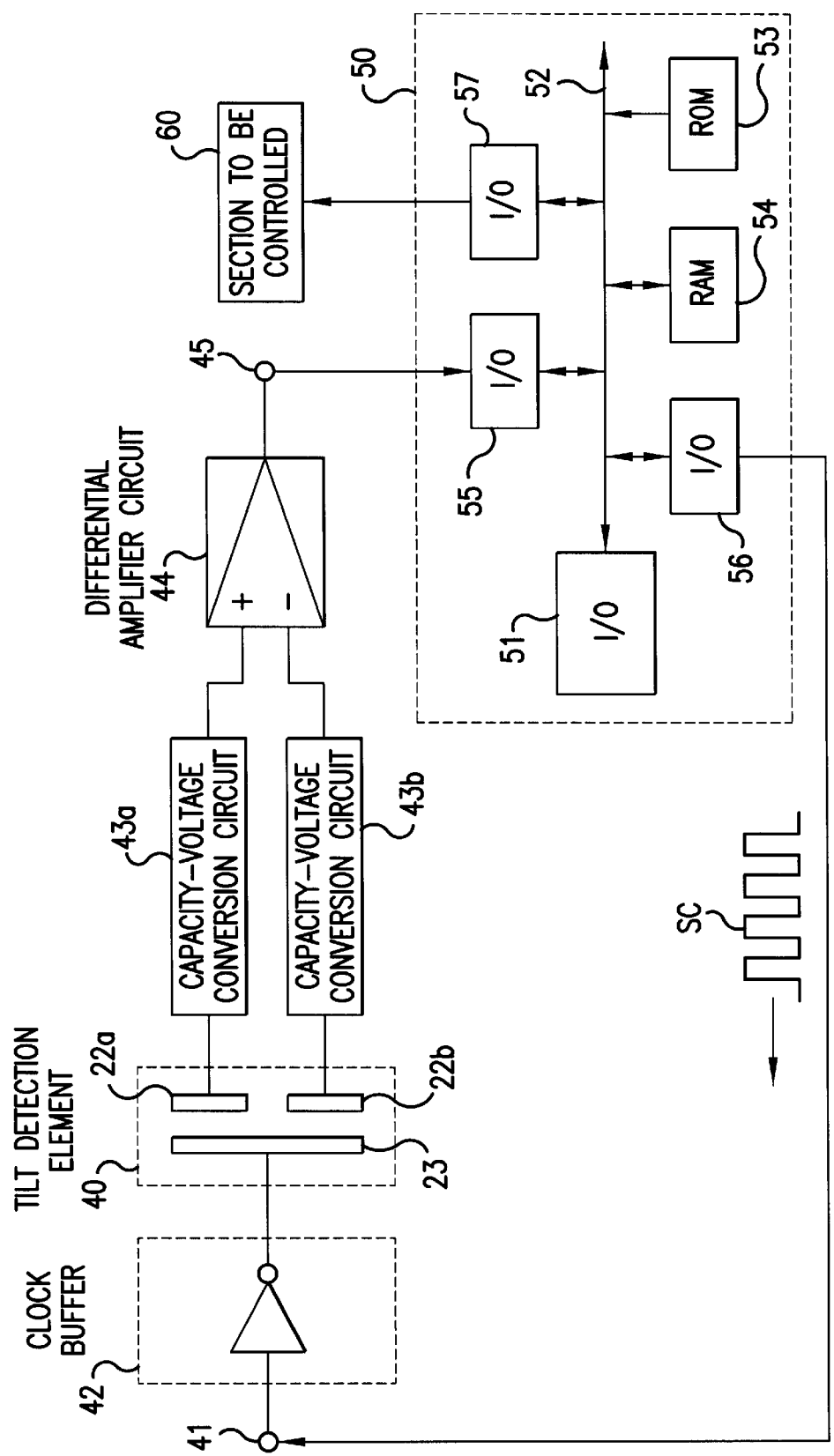
FIG. 3 is a schematic view of a signal processing circuit section of a tilt sensor according to an embodiment of the present invention.
Figure 4:
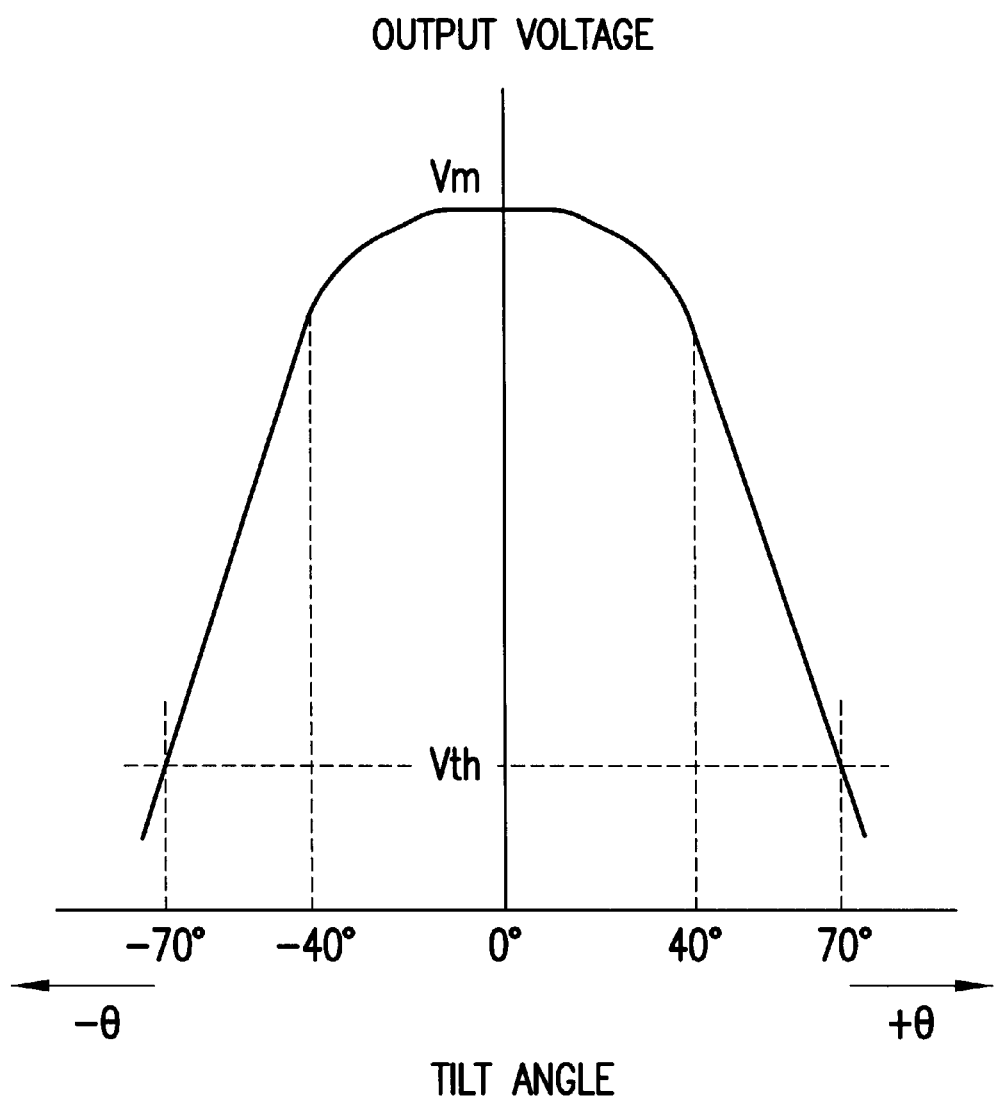
FIG. 4 is a graphical view showing output voltage characteristics of a tilt sensor according to an embodiment of the present invention.

Hereinafter, the present invention will be described in detail with reference to the accompanying drawings. FIG. 1 is an exploded view of a tilt sensor according to an embodiment of the present invention. FIG. 2 is a cross-sectional view of the tilt detection element of the tilt sensor taken along a plane cut normal to a front plane FIG. 3 is a schematic view of a signal processing circuit section of a tilt sensor according to an embodiment of the present invention. FIG. 4 is a graphical view showing output voltage characteristics of a tilt sensor according to an embodiment of the present invention.

A printed circuit board 21 made of a heat resistant material, for example, a laminate made of glass cloth and epoxy resin, is disposed vertically with respect to a reference plane for measuring a tilt angle when a tilt sensor is fixed to an object whose tilt angle is to be measured. In FIG. 1, the reference plane is designated by a plane including an imaginary line L0 shown by a double-dotted and dashed line. This reference plane becomes a plane to be measured. This plane defined by the imaginary line L0 becomes a reference plane from which to measure tilt angle.

Figure 5:
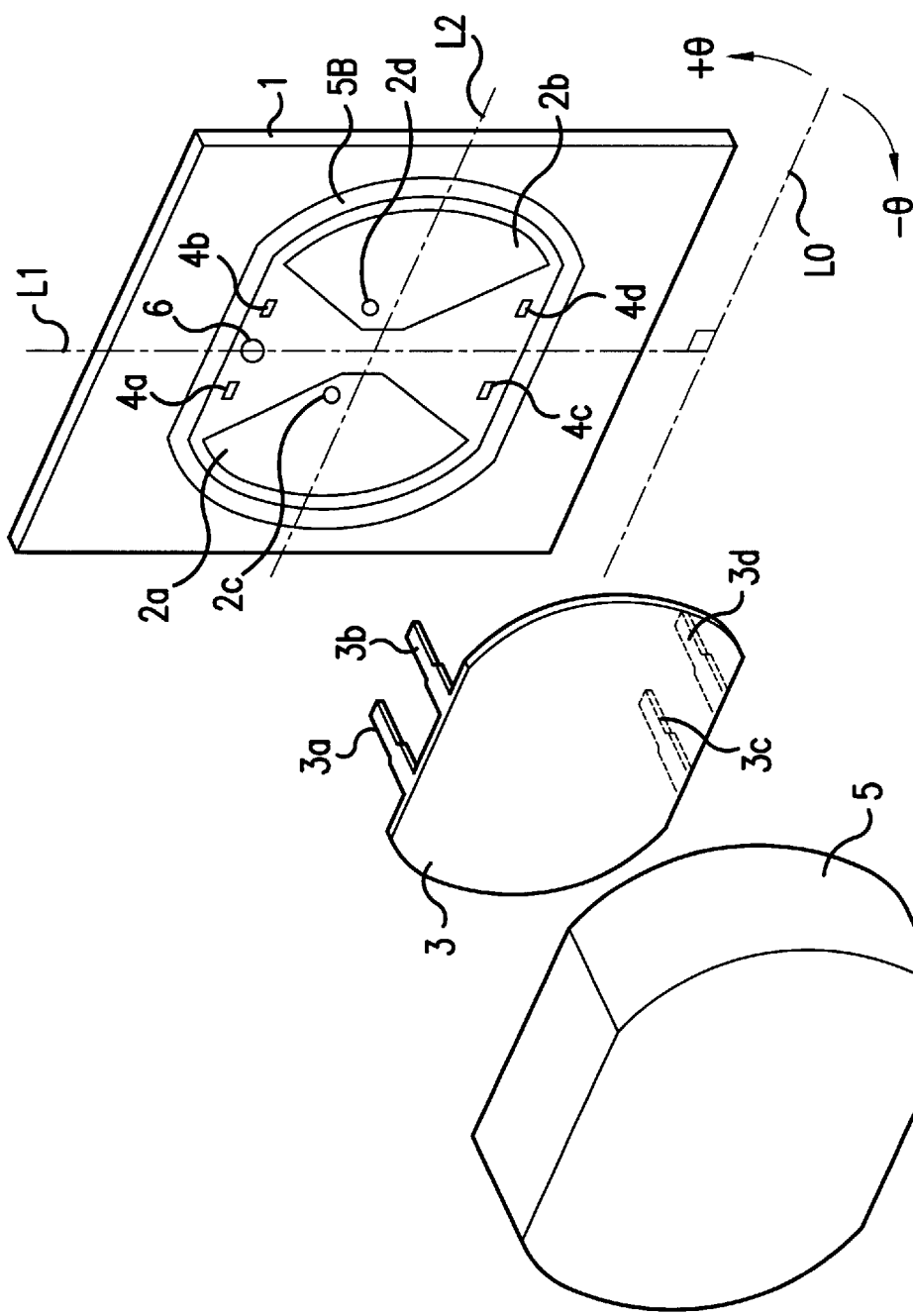
FIG. 5 is an exploded view of a conventional tilt sensor.
Figure 6:
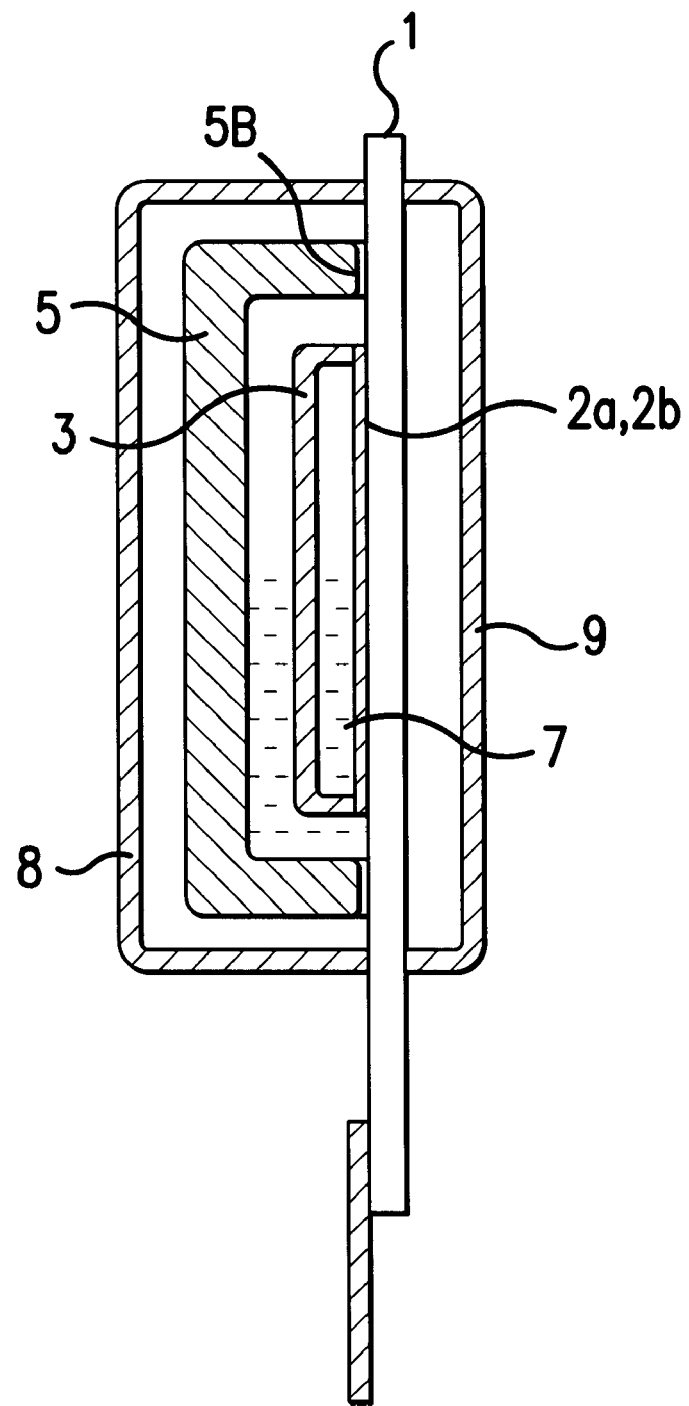
FIG. 6 is a cross-sectional view of a conventional tilt sensor.

The reference plane is in a "0 degree" tilt angle when the reference plane includes a line normal to the direction of gravity. In the printed circuit board 21, a pair of differential electrodes 22a, 22b are formed of a copper foil pattern electrically independent of each other in two regions. The two regions (upper and lower) are defined by a plane formed along the intersection of (an imaginary line L2 shown by a double-dotted and dashed-line in FIG. 5) both the reference plane and the surface of the printed circuit board 21.

The signal processing circuit section of the tilt sensor, which includes a printed wiring pattern and associated electronic parts will be described hereinafter. The signal processing circuit section is mounted on the surface opposite to the surface on which the differential electrodes 22a, 22b of the printed circuit board 21 are formed. The respective differential electrodes 22a, 22b are connected to the copper foil pattern on the surface of the printed circuit board 21 where the signal processing circuit section is formed via through holes, at the electrodes points 22c, 22d shown in FIG. 1.

The pair of differential electrodes 22a, 22b are formed as an electrode pattern of a shape symmetric with respect to the imaginary line L2. Also, each of the pair of differential electrodes 22a, 22b is formed as an electrode pattern of a shape which is symmetric with respect to the imaginary line L1. The imaginary line L1 is normal to the imaginary L2 and/or the reference plane. In the example shown in FIG. 1, each of the differential electrodes 22a, 22b is shaped like a vertical fan.

In the example shown in FIG. 1, the arc-shaped periphery of each of the differential electrodes 22a, 22b is a circular arc which follows the path of a circle with its center at the point of intersection of the imaginary line L1 and the imaginary line L2. In this preferred embodiment, the diameter of the circle is set at 14 mm, for example.

In this case, the open angle S of each of the fan-shaped differential electrodes 22a, 22b is set according to the desired range of measured tilt angle. This range is set based upon the required output signal of the tilt sensor necessary to provide a linear characteristic to a change in tilt. When the output characteristic of the tilt sensor is required to be linear in the range where the tilt angle from the position where the tilt angle is 0 degree is larger than a predetermined value θa, the open angle S is defined as S=(90−θa)·2. In this example, the open angle S is set at 100 degrees for the purpose of making the output characteristic larger than 40 degrees from the tilt angle from the 0 degree position.

A reference numeral 23 designates a common electrode plate formed of a conductive material having a desired rigidity. This common electrode plate 23 is shaped like a gourd such that the common electrode 23 exactly matches the pair of differential electrodes 22a, 22b when it is placed thereon.

In this embodiment, the common electrode plate 23 is mounted on the printed circuit board 21 in a state where it is held in parallel to the differential electrodes 22a, 22b with a gap between them. As shown in FIG. 2, the common electrode plate 23 is mounted by inserting two terminals 23a, 23b, which are integral with the plate 23 and formed by bending the plate 23 at right angles, into the terminal holes 24a, 24b made in the printed circuit board 21. The terminals 23a, 23b are then soldered to the surface of the printed circuit board 21 on which the signal processing circuit section is formed.

As shown in FIG. 1, the two terminals 23a, 23b formed of the common electrode plate 23 are formed on the constricted portion of the gourd-like shape of the common electrode plate 23 and are inserted into the terminal holes 24a, 24b made between the differential electrodes 22a, 22b in the portion of the printed circuit board 21 where the electrode pattern is not formed. This can reduce the tilt detection element size in at least one direction (e.g. the horizontal direction in FIG. 1).

An oil case 25 formed of plastics having proper flexibility is shaped like a letter U in cross section. As shown in FIG. 2, the oil case 25 forms a closed space with the printed circuit board 21 when its end face is bonded to the printed circuit board 21 with bonding means such as a double-faced adhesive tape 25B or a similar adhesive.

The differential electrodes 22a, 22b, the common electrode 23, and the case 25 are arranged so that their opposite faces are parallel to each other and that the center of gravity of the common electrode 23 agrees with that of the case 25.

The closed space formed by the case 25 and the printed circuit board 21 is filled with a dielectric liquid 27 such as a silicone oil or the like. The dielectric liquid 27 is poured from a through hole 26a made in the differential electrode 22a of the printed circuit board 21 to a level of approximately half of the effective volume in the closed space. This level of the imaginary line L2 defines this level as shown in FIG. 1.

The through hole 26a made in the differential electrode 22a of the printed circuit board 21 is filled and sealed with solder from the side of the printed circuit board 21 on which the signal processing circuit section is mounted. After the closed space is filled with the dielectric liquid 27, the through hole 26a is easily filled with the solder because it is made in the copper foil pattern.

The linear characteristic portion of the output of the tilt sensor described below is compensated by a differential electrode 22a pairing with the differential electrode 22b. A through hole 26b is filled and sealed with solder in the like manner described above. In this case, the through hole 26a and the through hole 26b have the same diameter and are made at positions symmetric with respect to the imaginary line L2.

The height of the closed space from the printed circuit board 21 is low, for example, 3 mm, and the distance between the printed circuit board 21 and the common electrode plate 23, is only about 1.5 mm. The dielectric liquid 27 is injected into the closed space with a nozzle like an injection needle inserted thereto. However the distance between the printed circuit board 21 and the common electrode plate, for example 1.5 mm, is too small to insert an injection needle.

Therefore, in a preferred embodiment and as shown in FIG. 1, through holes 23c, 23d having the same diameter are made in the common electrode plate 23 at positions corresponding to the through holes 26a, 26b of the differential electrodes 22a, 22b to ensure an adequate distance to insert the nozzle for injecting the dielectric liquid 27, for example 3 mm.

Since the through holes 23c, 23d of the common electrode plate 23 are symmetric with respect to the imaginary line L2, it is possible to compensate the linear characteristic portion of the output of the tilt sensor described below.

Further, one of the through holes at which the electrode points 22c, 22d are formed, e.g. the electrode point 22c in the embodiment shown in FIG. 1, is used as a hole for purging air when the dielectric liquid 27 is injected thereto. In order to compensate the linear characteristic portion of the output of the tilt sensor, the through hole at which the electrode points 22c, 22d are formed are made in the differential electrodes 22a, 22b at the points symmetric with respect to the imaginary line L2. The electrode points 22c, 22d are sealed with solder after the dielectric liquid 27 is injected.

Electrostatic shielding plate 28, 29 for preventing the effect of the outside is mounted on the printed circuit board 21 to cover the case 25 and its surroundings. The electrostatic shielding plate 29 is mounted on the printed circuit board 21 to cover the signal processing circuit section described below.

Also, a conductive plate 31 is fixed to the outer flat surface of the oil case 25. This conductive plate 31 is fixed to the printed circuit board 21 with conductive fixing pins 32 through the oil case 25. The tip ends of the conductive fixing pins 32 are connected to the grounded conductor of the printed circuit board 21. This arrangement ensures that the conductive plate 31 is electrically grounded.

The portion of the printed circuit board 21, which the end face of the oil case 25 is put into contact with and the double-faced adhesive type 25B is placed on, is provided with the copper foil pattern. The copper foil pattern is formed in a shape corresponding to the end face of the oil case 25 for the purpose of making the surfaces flat. This copper foil pattern is connected to an earth pattern on the reverse surface side of the printed circuit board 21 via the hole through which the pin 32 is inserted to be grounded.

FIG. 3 is a schematic view of a signal processing circuit section of a tilt sensor according to an embodiment of the present invention. In a preferred embodiment, a clock signal SC is enters the signal processing circuit section through an input terminal 41. In FIG. 3, this clock signal SC is supplied from a control circuit 50 mounted on a control circuit board other than the tilt sensor.

The clock signal SC entered through the input terminal 41 and having a predetermined frequency is wave-shaped by a clock buffer 42. The clock buffer 42 can be for example, a C-MOS (complementary metal oxide semiconductor) inverter to correct the waveform of the entered input clock signal.

The output terminal of this clock buffer 42 is connected to the common electrode plate 23 of the tilt detection element 40 in the preferred embodiment shown in FIG. 1 and FIG. 2, as described above. The pair of differential electrodes 22a, 22b of the tilt detection element 40 are connected to the input terminals of capacity-voltage conversion circuits 43a, 43b, respectively.

The output terminals of the capacity-voltage conversion circuits 43a, 43b are connected to the input terminals of a differential amplifier circuit 44. The output terminal 45 of the tilt sensor is taken out of differential amplifier circuit 44.

Figure 7:
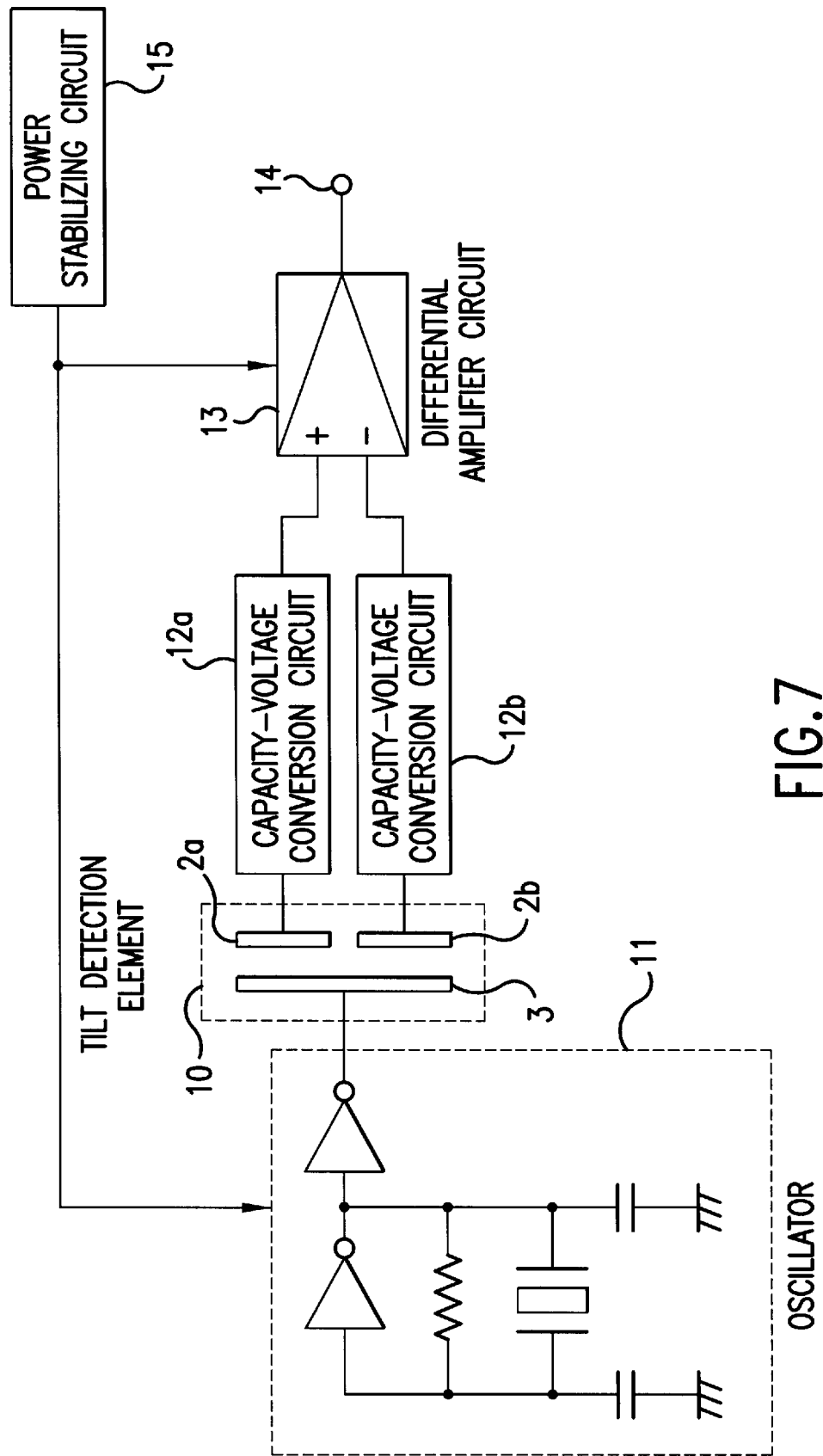
FIG. 7 is a schematic view of a signal processing circuit section of an exemplary, conventional tilt sensor.
Figure 8:
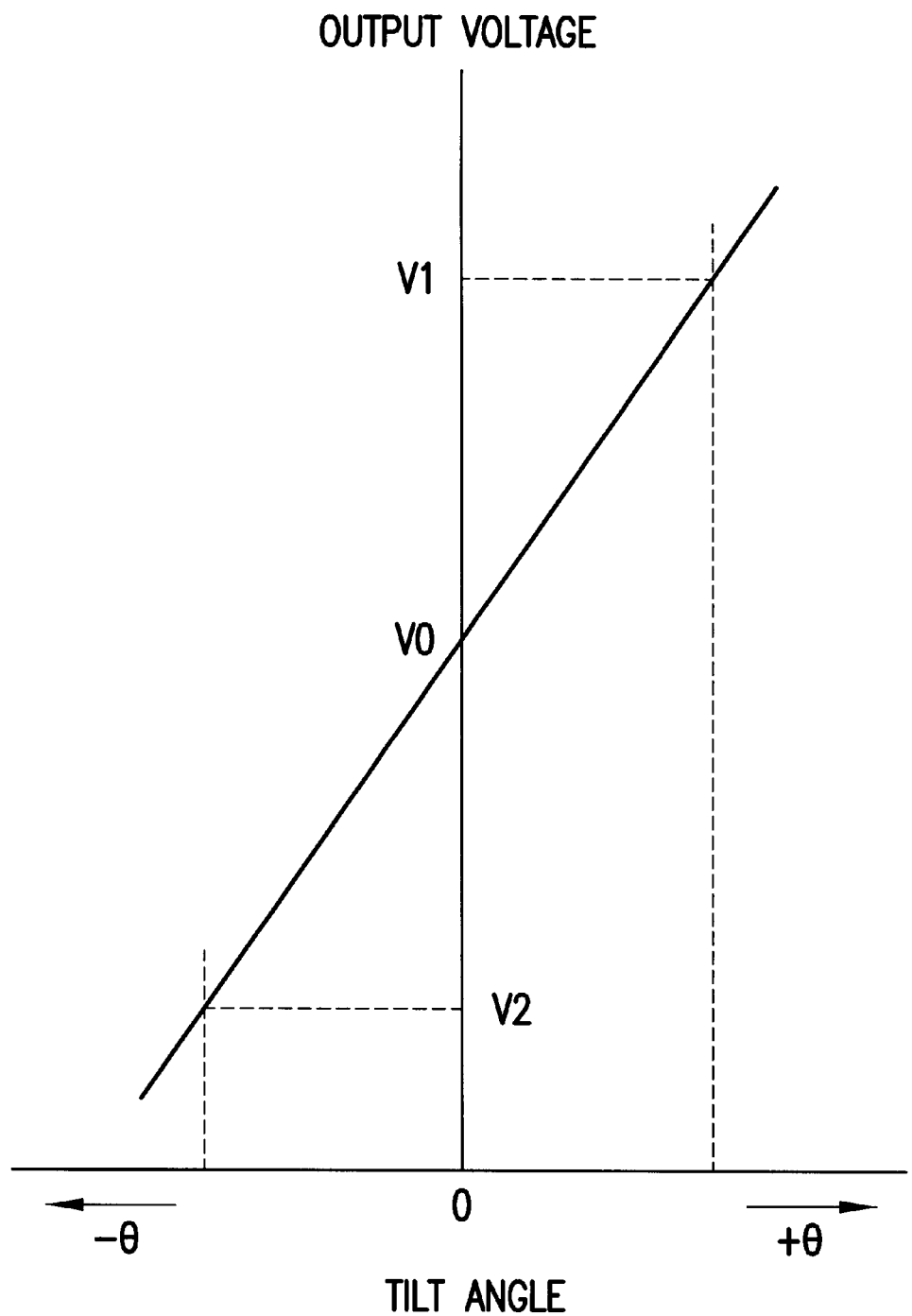
FIG. 8 is a graphical view showing output voltage characteristics of a conventional tilt sensor.

Although omitted in FIG. 3, this signal processing circuit section is not provided with a conventional power stabilizing circuit as shown in FIG. 7, but is instead supplied with a stabilized power supply voltage from an outside source.

Since the signal processing circuit section of this preferred embodiment is arranged in this manner, the clock signal SC entered through the input terminal 41 is waveshaped by the clock inverter 42 and then is supplied to the capacity-voltage conversion circuits 43a,43b through first and second capacitors. The wave-shaped clock signal SC is supplied to the capacity-voltage conversion circuit 43a, through the first capacitor which includes the differential electrode 22a and the common electrode plate 23. The wave-shaped clock signal SC is also supplied to the capacity-voltage conversion circuits 43b through a second capacitor constituted by the differential electrode 22b and the common electrode plate 23.

Here, peak value signals corresponding to the capacity Ca of the first capacitor and the capacity Cb of the second capacitor are supplied to the capacity-voltage conversion circuits 43a, 43b, respectively. The capacity-voltage conversion circuits 43a, 43b rectify the input signals, respectively, and produce smoothed voltage.

The respective output voltages of the capacity-voltage conversion circuits 43a, 43b have magnitudes corresponding to peak values of the capacity-voltage conversion circuits 43a, 43b. The capacity Ca of the first capacitor and the capacity Cb of the second capacitor are these peak values.

Therefore, the differential amplifier circuit 44 produces the differential voltage between the output voltage of the capacity-voltage conversion circuits 43a and the output voltage of the capacity-voltage conversion circuits 43b as the output of the tilt sensor at the output terminal 45.

The output voltage of the tilt sensor produced at the output terminal 45 is supplied to the control circuit 50. In this embodiment, the control circuit 50 includes a microcomputer in which a CPU 51, a system bus 52, a program ROM 53, a work area RAM 54, and I/O ports 55, 56, 57 is provided.

The control circuit 50 supplies the clock signal SC to the input terminal 41 of the tilt sensor through the I/O port 56. An output voltage from the output terminal 45 of the tilt sensor is applied to the I/O port 55 of the control circuit 50 as a tilt detection output through an A/D converter not shown.

The control circuit 50 detects, according to a tilt threshold value detection program stored in the program ROM 52, whether the output voltage of the tilt sensor exceeds a predetermined threshold voltage or not. When the control circuit 50 detects that the output voltage exceeds the threshold voltage, the control circuit 50 supplies a corresponding control signal to a section 60 to be controlled to put a predetermined control into practice.

The tilt sensor provided with the tilt detection element 40 and the signal processing circuit section is mounted on the plane to be measured which is the reference plane for measuring tilt. As described above, the input terminal 41 and the output terminal 45 are connected to the control circuit 50. The tilt sensor is placed such that the surface of the printed circuit board 21 of the tilt detection element 40 becomes the plane, including the tilt direction, to be measured, as is the case described above.

When the plane to be measured is at the position where it is not actually tilted, e.g the tilt angle is 0 degree (the plane to be measured is a plane including a line normal to the direction of the gravity), the entire differential electrode 22b is dipped in the dielectric liquid 27. In contrast, the differential electrode 22a is not exposed at all or remains undipped in the dielectric liquid 27.

Therefore, the capacity Cb of the second capacitor constituted by the differential electrode 22b and the common electrode plate 23, as a variable capacity corresponding to the amount of immersion in the dielectric liquid, becomes a maximum. On the other hand, the capacity Ca of the first capacitor constituted by the differential electrode 22a and the common electrode plate 23 becomes a minimum value.

FIG. 4 is a graphical view showing output voltage characteristics of a tilt sensor according to an embodiment of the present invention. The difference between the output voltages of the capacity-voltage conversion circuits 43a, 43b becomes a maximum and the output voltage of the tilt sensor exhibits a maximum value Vm as shown in FIG. 4.

Even when the plane to be measured is tilted in the tilt direction to be measured, as described above, in the range of tilt angle not exceeding 40 degrees in this embodiment, the differential electrode 22a keeps the state in which the nearly all of the differential electrode 22a is dipped in the dielectric liquid 27. That is, the range of tilt angle which does not exceed the angle K=90−S/2 corresponding to the open angle S of fan-shaped differential electrodes 22a, 22b, with respect to the reference plane. Similarly, the differential electrode 22b maintains a state in which the differential electrode 22a is hardly dipped in the dielectric liquid 27.

Accordingly, the capacity Ca of the first capacitor and the capacity Cb of the second capacitor are hardly varied and the resulting output voltage of the differential amplifier 44 is kept approximately at the voltage Vm.

When the plane to be measured is further tilted in the tilt direction to be measured and the tilt angle exceeds the above-mentioned K, in either of the cases where the direction of tilt is in the direction of $+\theta$ or $-\theta$, a part of the differential electrode 22a which has been nearly wholly dipped in the dielectric liquid 27 is removed from the surface of the dielectric liquid 27 and a part of the differential electrode 22b is immersed by the same proportion into the dielectric liquid 27.

For this reason, the capacity Ca of the first capacitor formed of the differential electrode 22a and the common electrode 23 is increased and the capacity Cb of the first capacitor formed of the differential electrode 22b and the common electrode 23 is decreased.

Accordingly, the difference between the output voltage of the capacity-voltage conversion circuit 43a and the output voltage of the capacity-voltage conversion circuit 43b is reduced. Then, the output voltage of the tilt sensor is decreased linearly in accordance with an increase in the tilt angle in either of the cases where the direction of tilt is in the $+\theta$ or $-\theta$ directions.

Therefore, if the control circuit 50 previously determines a single voltage Vth corresponding to a threshold tilt angle th detection and detects whether the output voltage of the tilt sensor is smaller than the voltage Vth, it is possible to detect whether the plane to be measured is tilted more than the threshold tilt angle th. This can be accomplished in either of the cases where the direction of tilt is in the direction of $+\theta$ or $-\theta$.

In this case, the control circuit 50 can detect whether the plane to be measured is tilted more than the threshold tilt angle th or not by means of a software program for monitoring whether the output voltage of the tilt sensor exceeds the single voltage Vth. Therefore, this produces an advantage that monitoring is made by a simple software, as compared with the conventional case where two threshold voltages are monitored.

The control circuit 50 may comprise discrete hardwares instead of the microcomputer. In this case, only a circuit for detecting whether the output voltage of the tilt sensor exceeds the single threshold voltage Vth is required. Therefore, it is not required to arrange two detection circuits for detecting whether the tilt angle exceeds separate threshold values in the direction of $+\theta$ or $-\theta$ directions, respectively.

Also, in the case of the above preferred embodiment, the signal processing circuit is not provided with an oscillator as is the case with the conventional tilt sensor and the clock signal is supplied from an external source. This arrangement can further reduce the size of the tilt sensor of the present invention, including the printed circuit board. Also, eliminating the conventional power stabilizing circuit contributes to reducing the size of the tilt sensor.

The output voltage of the capacity-voltage conversion circuit 43a is supplied to the non-inversion input terminal of the differential amplifier circuit 44 and the output voltage of the capacity-voltage conversion circuit 43b is supplied to the inversion input terminal of the differential amplifier circuit 44. Therefore, the differential amplifier circuit 44 has the characteristics of the output voltage shown in FIG. 4.

However, if applying the output voltages of the capacity-voltage conversion circuits 43a, 43b to the input terminals of the differential amplifier circuit 44 is the reverse of the case shown in FIG. 3, the characteristics of the output voltage of the differential amplifier circuit 44 is the reverse of those in the case shown in FIG. 4.

That is, in the reverse case, when the difference between the capacitance Ca of the first capacitor and the capacitance Cb of the second capacitor is a maximum, the output voltage is a minimum. As the difference between the two capacitances (Ca, Cb) decreases, the output voltage increases. In this case, it is possible to detect whether the plane to be measured is tilted more than the threshold tilt angle th when detecting that the output voltage is larger than the threshold voltage Vth.

The output signal varies in the same way in either of the cases where the plane to be measured is tilted in the either the +θ or −θ tilt direction, as described above. Therefore, according to the present invention, the number of threshold values required for detecting a tilt angle larger than a predetermined tilt angle is reduced to one threshold value used for either tilt direction.

The invention being thus described, it will be obvious that the same may be varied in many ways. Such variations are not to be regarded as a departure from the spirit and scope of the invention, and all such modifications as would be obvious to one skilled in the are intended to be included within the scope of the following claims.

What is claimed is:

1. A tilt sensor comprising:

a printed circuit board disposed in a direction normal to a reference plane for measuring a tilt angle;

a pair of differential electrodes mounted on the printed circuit board;

a common electrode plate opposed to the pair of differential electrodes with a predetermined gap formed between said differential electrodes;

a common electrode fixed to the printed circuit board by a terminal formed from the common electrode plate;

a dielectric liquid filled into a closed space in a state where its surface level varies according to the tilt angle of the reference plane;

a signal processing circuit section formed on the printed circuit board, said signal processing circuit section producing an output signal corresponding to a difference in capacity between two capacitors, each capacitor includes the common electrode and a respective differential electrode of said pair of differential electrodes, as a tilt angle detection output, wherein the pair of differential electrodes are mounted electrically independently of each other in upper and lower regions respectively, wherein said upper and lower regions are divided by a horizontal centerline, said horizontal centerline passing through a center of gravity of said printed circuit board in a direction normal to a direction of gravity when said printed circuit board is in a no tilt condition, and said pair of differential electrodes are formed in shapes symmetrical to said horizontal centerline and a vertical centerline of said printed circuit board, said vertical centerline passing through said center of gravity and normal to said horizontal centerline; and an oil case for storing the pair of differential electrodes and the common electrode plate and forming said closed space between itself and the printed circuit board.

2. The tilt sensor according to claim 1, wherein the dielectric liquid is filled into the closed space to the level of the horizontal centerline.

3. The tilt sensor according to claim 1, wherein the signal processing circuit section further comprises:

a buffer circuit for receiving an exterior signal of a predetermined frequency and supplying it to the common electrode;

a first capacity-voltage conversion circuit for rectifying a first capacitor signal taken out of a first capacitor of said two capacitors and converting said first capacitor signal into a first output voltage;

a second capacity-voltage conversion circuit for rectifying a second capacitor signal taken out of a second capacitor of said two capacitors and converting said second capacitor signal into a second output voltage; and a differential amplifier circuit for producing a differential voltage between the first output voltage and the second output voltage.

4. The tilt sensor according to claim 1, wherein the dielectric liquid is filled into the closed space to the level of the horizontal centerline.

5. The tilt sensor according to claim 1, wherein said no tilt condition of said printed circuit board occurs when said horizontal centerline is normal with the direction of gravity and said tilt angle is equal to zero degrees.

6. The tilt sensor according to claim 1, wherein said pair of differential electrodes includes an upper differential electrode and a lower differential electrode formed of copper foil patterns.

7. The tilt sensor according to claim 6, wherein said upper and lower differential electrodes are fan-shaped and have a corresponding open angle S, wherein said open angle S is set according to a desired range of tilt angle to be measured.

8. The tilt sensor according to claim 7, wherein a predetermined threshold tilt angle value θa for said tilt sensor defines said open angle S according to the relationship of S=(90−θa)·2.

9. The tilt sensor according to claim 1, wherein said common electrode plate includes a pair of terminals corresponding to a pair of terminal holes formed on said printed circuit board.

10. The tilt sensor according to claim 1, wherein said oil case is bonded to said printed circuit board with bonding means.

11. The tilt sensor according to claim 2, wherein said differential electrodes, said common electrode and said oil case are arranged parallel to each other and vertically arranged so that a center of gravity of said common electrode is aligned with a center of gravity of said oil case.

12. The tilt sensor according to claim 1, wherein electrostatic shielding plate is mounted on said printed circuit board and covers said oil case and said signal processing section.

13. The tilt sensor according to claim 2, wherein said common electrode plate includes through holes for permitting purging of air and filling of dielectric liquid.

14. The tilt sensor according to claim 12 further comprising a conductive plate fixedly engaged with an outer surface of said oil case, wherein said conductive plate is secured to said printed circuit board with conductive fixing pins through said oil case.

15. The tilt sensor according to claim 3, wherein an output voltage of said tilt sensor produced at an output terminal of said tilt sensor is supplied to a control circuit.

16. The tilt sensor according to claim 15, wherein said control circuit further comprises a microcomputer including a CPU;

a system bus, a program ROM for storing a predetermined threshold tilt value detection program;

a work area RAM; and

I/O ports.

17. A tilt sensor comprising:

a printed circuit board disposed in a direction normal to a reference plane for measuring a tilt angle;

a pair of differential electrodes mounted on the printed circuit board, said differential electrodes are electrically independent of each other;

a common electrode plate opposed to the pair of differential electrodes with a predetermined gap therebetween;

a common electrode fixed to the printed circuit board by a terminal formed from the common electrode plate;

an oil case for storing the pair of differential electrodes and the common electrode plate in a closed space formed by said oil case and the printed circuit board;

a dielectric liquid filled into the closed space in a state where a dielectric liquid surface level varies according to the tilt angle of the reference plane; and a signal processing circuit section which is formed on the printed circuit board and is capable of producing the output signal of the level corresponding to the difference in capacity between two capacitors, each of said two capacitors includes the common electrode and an electrode from the pair of the differential electrodes, as a tilt detection output, wherein the pair of differential electrodes are mounted electrically independently of each other in the regions which are divided by a first intersection where a plane parallel to the reference plane intersects the printed circuit board, and are formed in a shape symmetric with respect to the first intersection and each of the pair of differential electrodes is formed in a shape symmetric with respect to a second intersection where a plane normal to the reference plane intersects the printed circuit board;

wherein the dielectric liquid is filled into the closed space to the level of the first intersection; and wherein the signal processing circuit section comprises:

a buffer circuit for receiving a signal of a predetermined frequency from the outside and supplying it to the common electrode;

a first capacity-voltage conversion circuit for rectifying a signal taken out of a first capacitor constituted by the common electrode and one electrode of the pair of differential electrodes and converting it into voltage;

a second capacity-voltage conversion circuit for rectifying a signal taken out of a second capacitor constituted by the common electrode and the other electrode of the pair of differential electrodes and converting it into voltage; and a differential amplifier circuit for producing a difference voltage output between the output voltage of the first capacity-voltage conversion circuit and that of the second capacity-voltage conversion circuit.

18. The tilt sensor according to claim 17, wherein said differential electrodes, said common electrode and said oil case are arranged parallel to each other and vertically arranged so that a center of gravity of said common electrode is aligned with a center of gravity of said oil case.

19. The tilt sensor according to claim 18, wherein said differential electrodes are fan-shaped and have a corresponding open angle S, wherein said open angle S is set according to a desired range of tilt angle to be measured.

20. The tilt sensor according to claim 19, wherein a predetermined threshold tilt angle value $\theta a$ for said tilt sensor defines said open angle S according to the relationship of $S=(90-\theta a)\cdot 2$.

* * * * *